US007239957B1

(12) United States Patent
Sweet et al.

(10) Patent No.: US 7,239,957 B1
(45) Date of Patent: Jul. 3, 2007

(54) METHOD AND SYSTEM FOR SEAMLESS TRANSITION BETWEEN MULTIPLE FEEDBACK RANGES

(75) Inventors: Benjamin David Sweet, Southfield, MI (US); Charles Francis Weber, South Lyon, MI (US); Jack Bruce Marshall, Detroit, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 1366 days.

(21) Appl. No.: 09/684,278

(22) Filed: Oct. 6, 2000

(51) Int. Cl.
*G06G 19/00* (2006.01)

(52) U.S. Cl. .................. 701/114; 701/102; 701/115

(58) Field of Classification Search .......... 123/399, 123/674, 703, 682; 701/101, 102, 114, 115; 73/117.3
See application file for complete search history.

(56) References Cited

U.S. PATENT DOCUMENTS

| 4,493,304 A | * | 1/1985 | Nakajima et al. | 123/479 |
| 4,903,671 A | * | 2/1990 | Araki et al. | 123/682 |
| 5,127,263 A | * | 7/1992 | Iizuka | 73/117.3 |
| 6,233,515 B1 | * | 5/2001 | Engelman et al. | 701/93 |
| 6,253,140 B1 | * | 6/2001 | Jain et al. | 701/67 |
| 6,325,046 B1 | * | 12/2001 | Kanno | 123/406.44 |

FOREIGN PATENT DOCUMENTS

JP 58-192945 * 11/1983

* cited by examiner

*Primary Examiner*—John Kwon
*Assistant Examiner*—Hieu T. Vo
(74) *Attorney, Agent, or Firm*—Brinks Hofer Gilson & Lione

(57) ABSTRACT

A method and system are provided for processing multiple sensor output signals of different ranges/sensitivities so as to provide a seamless transition when switching between the different ranges. More specifically, a determination is made as to whether a selected sensor output range is of a sensitivity higher than a predetermined sensitivity. If the sensitivity is higher, the value of a higher sensitivity sensor output is converted to a value corresponding to the predetermined sensitivity range. An error value is then determined between the converted sensor output value and a sensor output corresponding to a range having the predetermined sensitivity. The sensor output is then modified based on the error value when the control process switches from the selected sensor output to the sensor output corresponding to the predetermined sensitivity. This insures that no glitches will occur in a controller output at the time of switchover.

11 Claims, 4 Drawing Sheets

METHOD AND SYSTEM FOR SEAMLESS TRANSITION BETWEEN MULTIPLE FEEDBACK RANGES

TECHNICAL FIELD

The present invention generally relates to feedback control arrangements, and more particularly, to an improved feedback arrangement that accurately process multiple feedback control signals having different ranges or scale factors.

BACKGROUND ART

Generally, in feedback control systems, information from feedback sensors is used to measure and ultimately control a system's output parameters or control signals. Difficulty arises in converting the feedback signal into an electrical or digital format when a system is required to support high resolution, i.e., how fine the measurement is, over a large range of operation, i.e., the possible range of the measurements. One solution to this problem is to use multiple sensors having outputs tailored to cover different ranges within the total measurement range. Each sensor is then provided with sufficient resolution within the designated range.

Alternatively, another solution is to pass the output of a single sensor through multiple amplifiers, where each amplifier is designed to operate only within a designated range of the total measurement range. Again, each amplifier is arranged to provide sufficient resolution within the designated range. While either solution can achieve the desired resolution and large size of measurement range, neither solution is able to transition smoothly between the multiple feedback sources or ranges.

For example, in either situation, i.e., a single sensor having a feedback signal processed into multiple gains, or multiple sensors having different gains, a sensor (or gain) is selected by a control process based on a desire to use a feedback signal within the associated range or gain. In this situation, the control process will continue to use the output signal from the selected range as long as the output signal remains below a particular threshold value. If the output signal exceeds the threshold value, the control process switches to processing the output signal associated with an adjacent range or gain.

The problem encountered with such an arrangement results from any mismatch or "error" between the two signals when transitioning between the two ranges. This is particularly true if the two ranges have a different resolution. In such a situation, the control process is likely to respond to the error between the transitioned to value and the actual measured value of the second range by generating a "bump" or "glitch" in the controller output. Such bumps or glitches are generally not acceptable where accuracy is desired in the control process.

Therefore, a need exists for an arrangement that can process multiple feedback signals of different range in such a manner as to produce a smooth, or seamless, transition between the different ranges.

DISCLOSURE OF THE INVENTION

Therefore, it is an object of the present invention to provide a method and system for processing multiple feedback signals of different ranges which provides a seamless transition when switching between the different ranges.

In accordance with this and other objects, the present invention provides a method and system for providing seamless transition between a plurality of sensor measurement ranges, where a particular sensor output corresponding to one of the plurality of sensor measurement ranges is selected as an input signal for a control process, and a determination is made as to whether the range of the selected sensor output is of a sensitivity higher than a predetermined sensitivity. If the sensitivity is higher, the value of a higher sensitivity sensor output is converted to a value corresponding to the predetermined sensitivity range. An error value is determined between the converted sensor output value and a sensor output corresponding to a range having the predetermined sensitivity. The sensor output is then modified based on the error value when the control process switches from the selected sensor output to the sensor output corresponding to the range of predetermined sensitivity.

Thus, the present invention advantageously avoids any "bump" or "glitch" in a controller output upon a transition between different sensors or different sensor gains, thereby resulting in smoother control operation and a higher quality product. In addition, a control process can use lower resolution (having a lower cost) A/D converter and still achieve acceptable sensor/control accuracy.

The above object and other objects, features and advantages of the present invention are more readily understood from a review of the attached drawings and the accompanying specification and claims.

BRIEF DESCRIPTION OF THE DRAWINGS

FIGS. 3(a)–(d) are graphs illustrating application of the present invention to four different sensor examples.

BEST MODES FOR CARRYING OUT THE INVENTION

Figure 1:
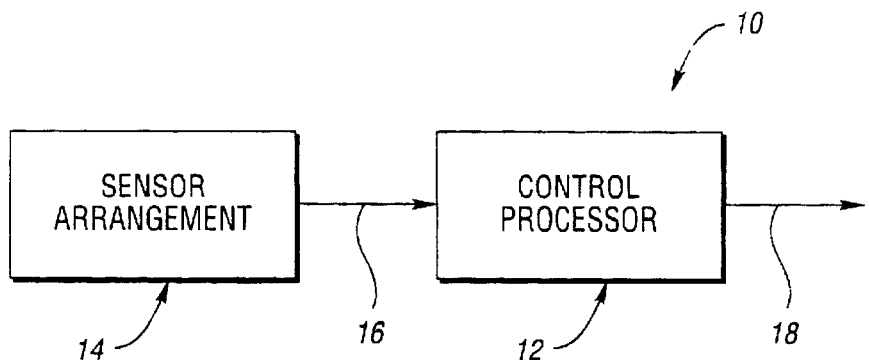
FIG. 1 is block diagram of a control process in accordance with the present invention.

Referring first to FIG. 1, a control system 10 having a feedback control input is shown in accordance with an exemplary embodiment of the present invention. More specifically, a control processor 12 is coupled to a sensor arrangement 14 capable of producing one or more signals 16 indicative of measurements made at different response ranges/scales, i.e., different sensitivities.

For example, one output can be indicative of sensor measurements made within a range representing a total system range of measurement, i.e., a base or common system resolution. One or more additional outputs can be indicative of a subset of the total system range magnified to provide increased measurement resolution. Sensor arrangement can include multiple sensors each having an output tailored to cover a different range within the total measurement range. Each sensor can be arranged in accordance with known design techniques to produce a desired resolution within the designated range. Alternatively, the output of a single sensor can be processed through multiple amplifiers. Each amplifier is designed to operate only within a designated range of the total measurement range, and to provide the desired resolution within the designated range.

Control processor 12 includes suitable programming to process the sensor output to generate one or more control or monitoring signals 18. The programming and control signals are derived in accordance with the intended application of the control system. For example, sensor arrangement 14 can be coupled to measure the position of a vehicle throttle plate, and controller 12 can form part of the engine control system for controlling movement of the throttle plate to a desired position.

Figure 2:
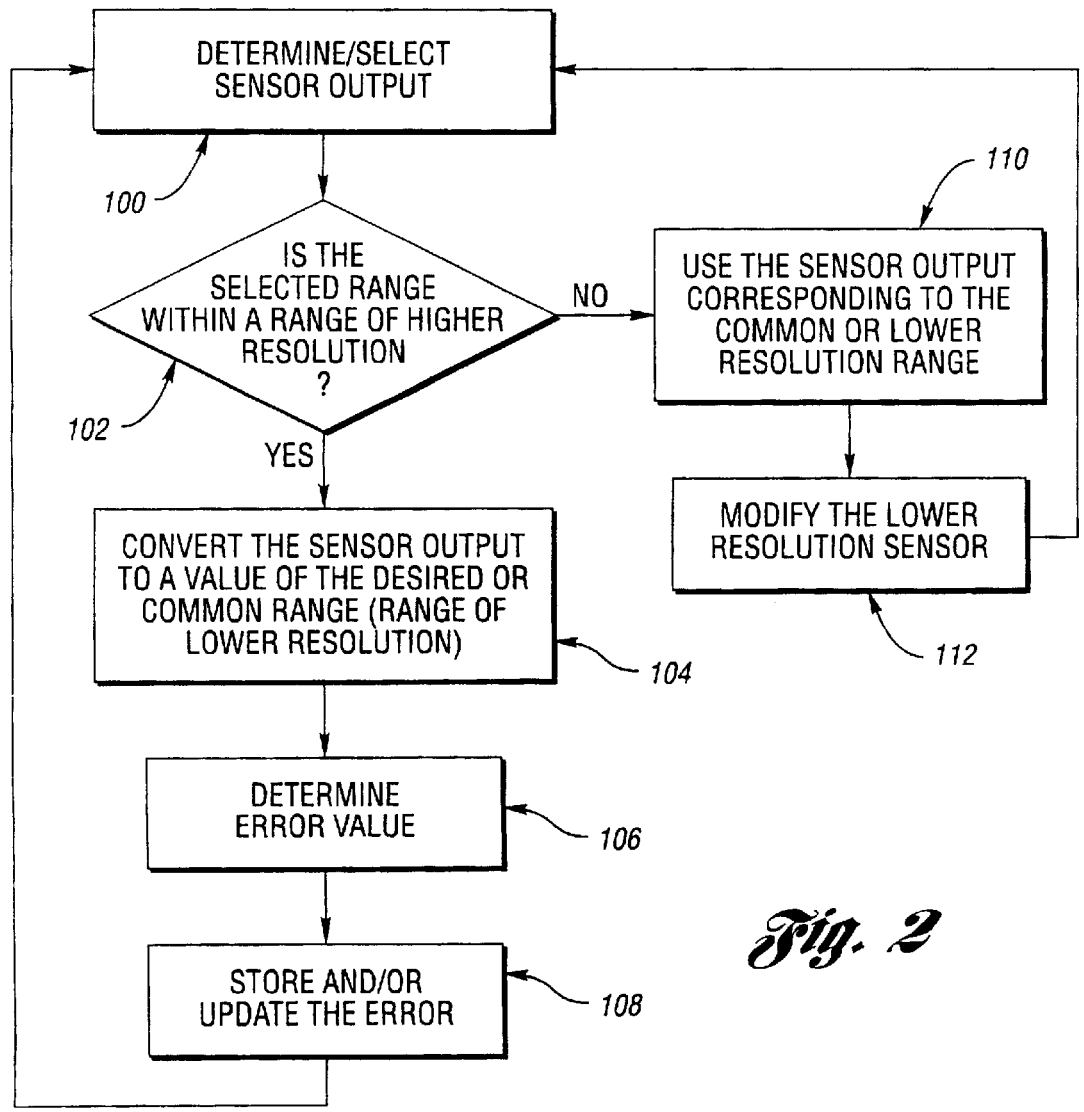
FIG. 2 is a flowchart illustrating the overall process for providing a seamless transition between different sensor ranges in accordance with the present invention.

Referring now to FIG. 2, a flow chart illustrates processing of the multiple range sensor output in accordance with the present invention. Specifically, as denoted at block 100, the current range of operation of the sensor output is determined or selected. For example, this can be accomplished by comparing the sensor output to a predetermined threshold value. If the output signal is less than the threshold value, the sensor signal is within a higher resolution range as noted at block 102, such as represented as range B in the graphs of FIGS. 3(a)–(d) described below. The lower resolution or base system range is selected if the output signal is out of range.

When the sensor output is currently operating in a range of higher sensitivity, the output signal is mapped or converted at block 104 into a value of the base resolution range, or other common or desired operating range, i.e., B'. In addition, when the system is using the higher resolution range/sensor output, the process also generates a value which can be used to offset or update the sensor output when operating in the lower resolution range.

More specifically, as denoted at block 106, an error signal is determined by subtracting the actual measured value corresponding to the base system range from the mapped value. As indicated at block 108, the error signal is stored and/or updated for use by the processor when operating lower resolution range. The process returns to block 100.

Referring again to the decisional block at 102, if the selected output is not within the higher resolution, the sensor output corresponding to the lower resolution or base system range is used as indicated at block 110. The lower resolution range is denoted as range A in FIGS. 3(a)–(d). As shown at block 112, the stored error value is then used by the control processor to modify the lower resolution sensor output.

Thus, with the present invention, the best range can be selected, while the inaccuracies of a lower resolution range can be offset based on previous operation in the higher range. This in turn eliminates or significantly reduces any "bump" or glitch resulting from an erroneous control signal generated by switchover between the higher and lower resolution ranges.

Figure 3A:
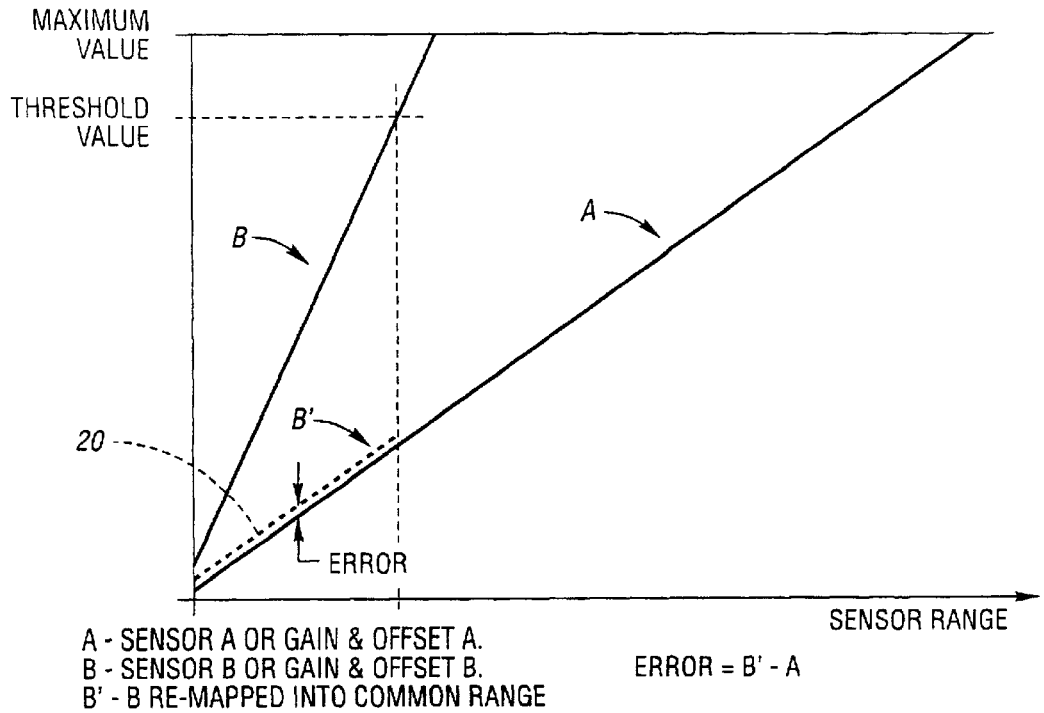

Referring now to the graphs of FIGS. 3(a)–(d), operation of the present invention is shown by plotting two different sensor responses, A and B, as a function of the associated sensor range and sensor output values. FIG. 3(a) illustrates an example where output A and B are both positive values, i.e., their respective response lines have a positive slope. As shown by dotted line 20, when the system is operating using output B (i.e., B is below the threshold value), the value of output B is simultaneously remapped to a value B' to produce a value in the same range as output A but having a higher resolution. The difference between line 20 and line A is the error signal used to offset output A, particularly when transitioning from use of output B to output A.

Figure 3B:
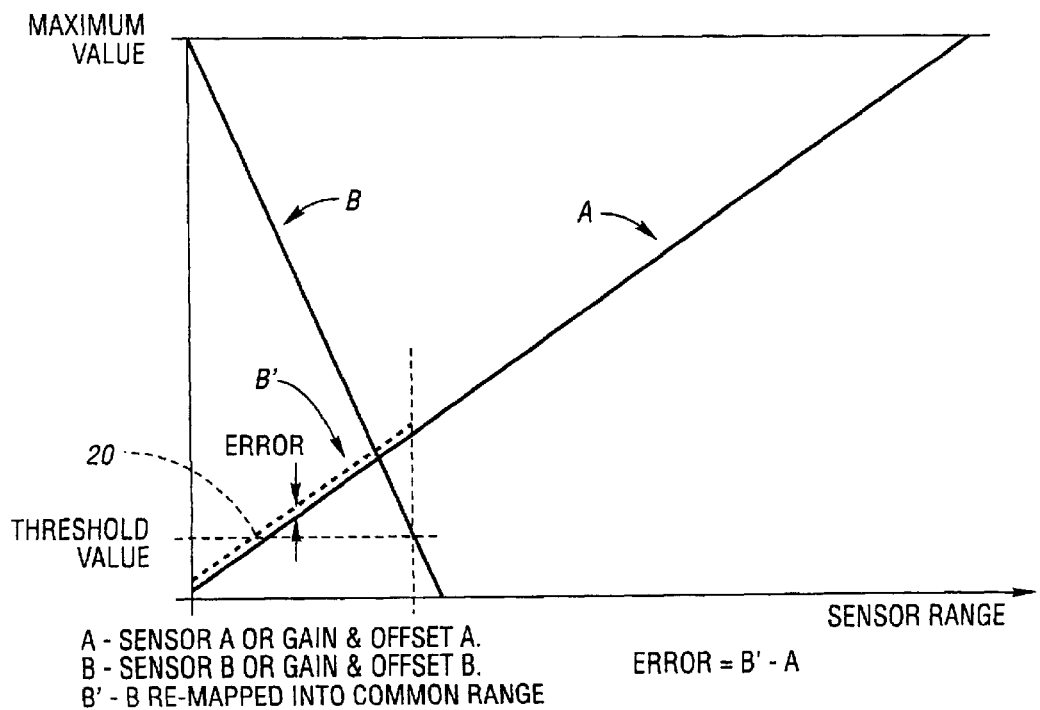

Likewise, FIG. 3(b) illustrates a situation where the B range is negative, i.e., the slope of line b is negative, while the A range is positive. As shown, remapping of the B values to B' values adjusts the sign of the B values so as to allow a proper comparison with the A range. Thus, the B' values can be remapped to a positive value. With respect to selecting the desired signal, it is noted that in a situation as represented in FIG. 3(b). i.e., signal B has a negative slope, signal B' is used if signal B is greater than the threshold value.

Figure 3C:
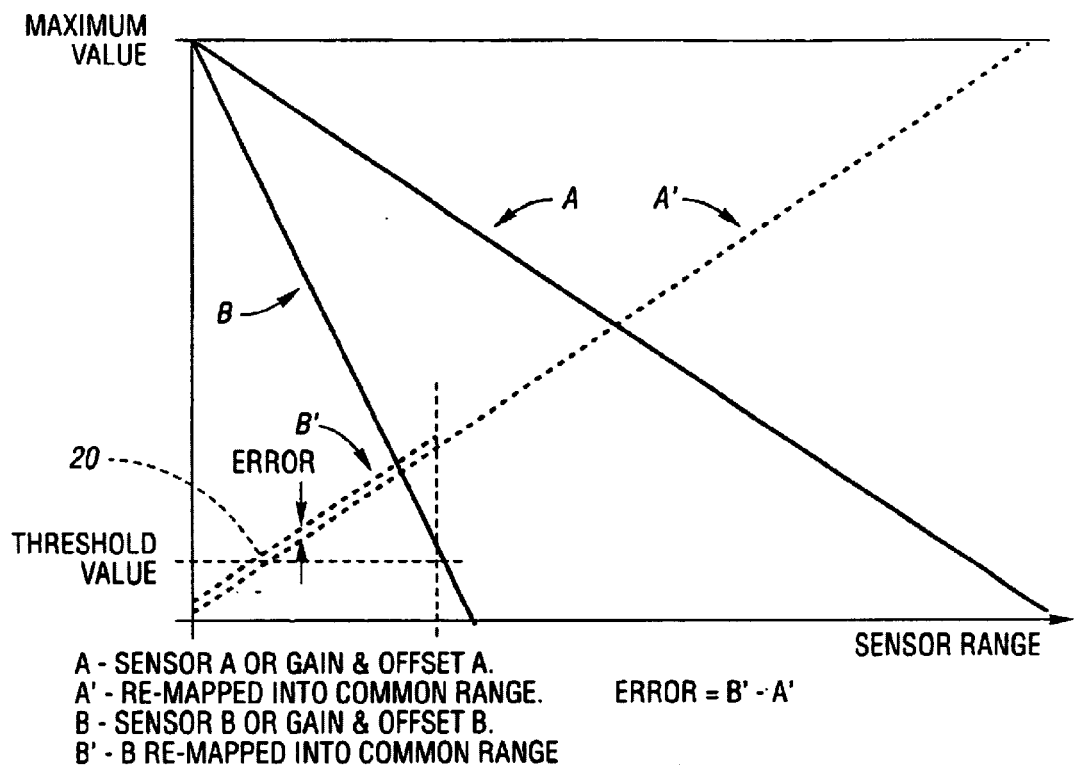
Figure 3B:
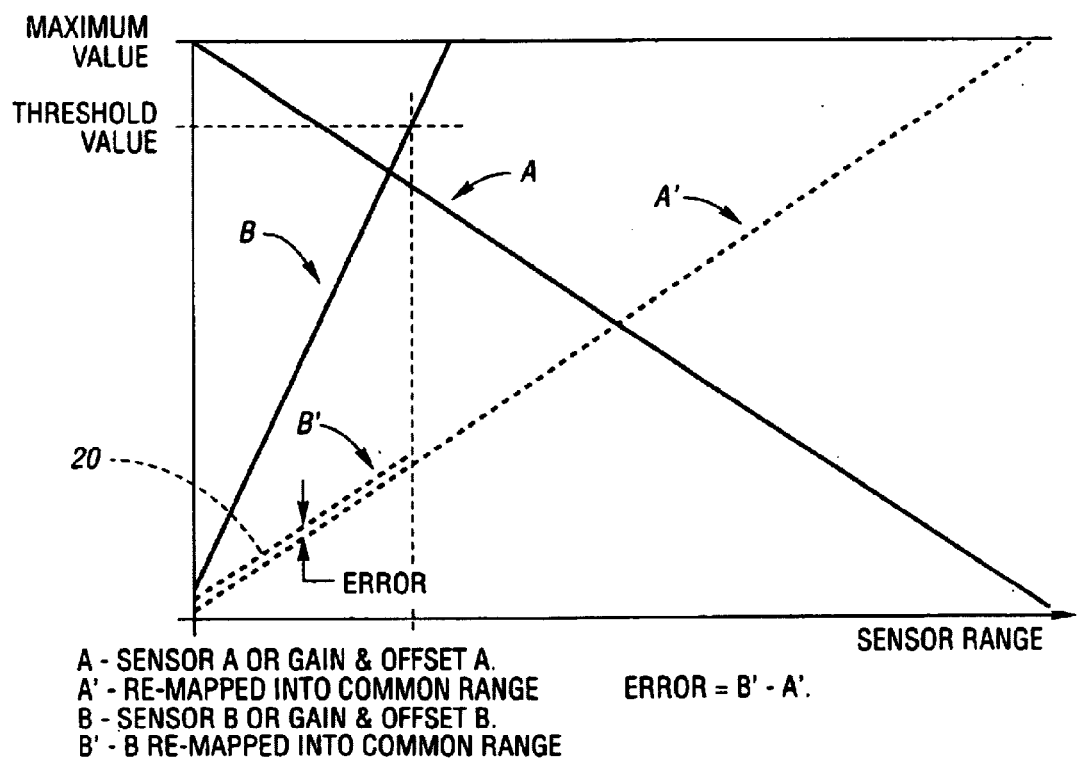

In FIG. 3(c), both output ranges A and B are negative. In this situation, the values of output A can likewise be simultaneously remapped to the common range as denoted by line A'. As with the situation represented in FIG. 3(b), negative values for both output A and B can then be properly compared as equivalent values in the common range.

FIG. 3(d) illustrates an example where output A is negative, and output B is positive. Again, output A is simultaneously remapped to a positive value A' in the common range, and output B is remapped as in FIG. 3(a).

Each situation shown in FIGS. 3(a)–(d) can be represented by the following logic statement:

If Signal B<Threshold Value

Then Signal B is in range: Thus,

B'=Signal B re-mapped into common range

Use Signal B' error=B'−Signal A

Else, Signal B is out of range: Thus,

Use Signal A+last known error value End If.

Figure 4:
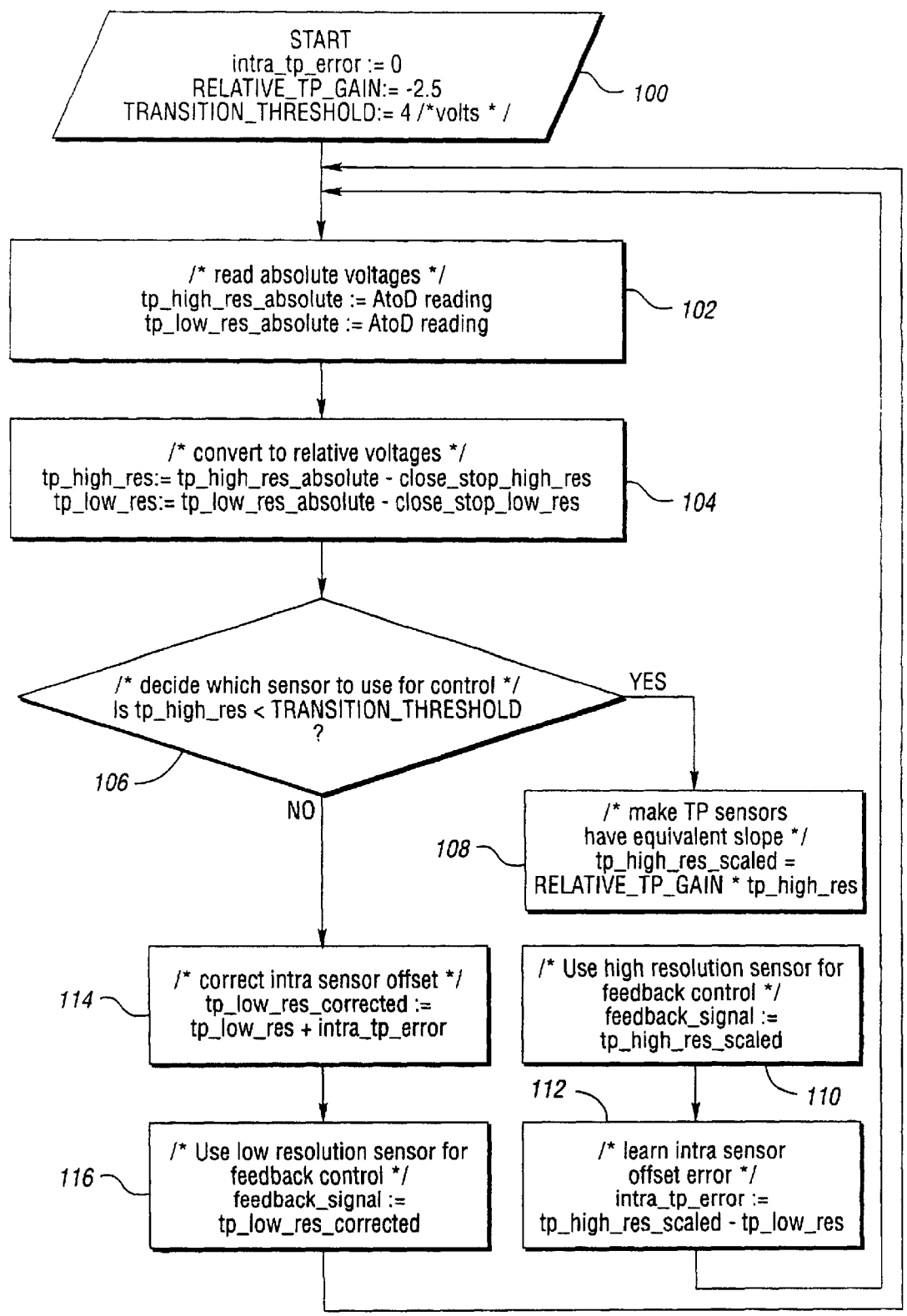
FIG. 4 is a flowchart illustrating an exemplary embodiment of the present invention.

Thus, the present invention advantageously avoids any "bump" or "glitch" in a controller output upon a transition between different sensors or different sensor gains, thereby resulting in smoother control operation and a higher quality product. In addition, a control process can use a lower resolution (having a lower cost) A/D converter and still achieve acceptable sensor/control accuracy. For example, with respect to a controller for controlling the position of a vehicle throttle plate, a 10-bit A/D converter can be used but still achieve the resolution of a 12-bit A/D converter by using a gain of 4 for smaller range values. Such an exemplary embodiment is shown in the flow chart of FIG. 4, where "tp" is used to designate "throttle position" in connection with a throttle position sensing system.

More specifically, as denoted at block 100, respective variables are initialized as follows: intra_tp_error is set to 0, RELATIVE_TP_GAIN is set to −2.5, and TRANSITION_THRESHOLD is set to a specific value such as 4 volts. At block 102, the sensor absolute voltage values, i.e., tp_high_res_absolute and tp_low_res_absolute are read from the A/D converter output. The absolute values are then converted to relative voltage levels at block 104 by subtracting a close_stop_high_res value and close_stop_low_res value from the high and low resolution absolute values, respectively.

As denoted at block 106, the control process then determines which sensor to use for control. More specifically, if tp_high_res<TRANSITION_THRESHOLD, the TP sensors are made to have an equivalent slope as denoted at block 108. This is done by scaling tp high res via multiplication with RELATIVE_TP_GAIN to produce tp_high_res_scaled. After scaling, the high resolution sensor output is used for feedback control at block 110, i.e., feedback_signal=tp_high_res_scaled. As denoted at block 112, any error between the low resolution sensor and the high resolution sensor is tracked and stored to provide for a smooth transition upon switching back to use of the low resolution sensor output for feedback control. This process is shown as intra_tp_error=tp_high_res_scaled−tp_low_res. The control process then returns to block 102.

Referring again to block 106, if tp_high_res is not greater than TRANSITION_THRESHOLD, the low resolution sensor output is corrected or updated at block 114 by combining with the most recently stored value for intra_ tp_error. After correction, the low resolution sensor output is used for feedback control at block 116. The control process then returns to block 102.

While the present invention has been specifically described in connection with feedback sensor signals of different ranges, the present invention is likewise applicable to multiple input signals of different ranges. Thus, signals A and B can represent a controller's reference input signals, i.e., a command signal instead of the feedback signal.

Therefore, it is understood that while the form of the invention herein shown and described constitutes a preferred embodiment of the invention, it is not intended to illustrate all possible forms there-of. It will also be understood that the words used are words of description rather than limitation, and that various changes may be made without departing from the spirit and scope of the invention disclosed.

What is claimed is:

1. A system for providing seamless transition between a plurality of sensor measurement ranges comprising:
    a sensor arrangement for providing output signals corresponding to the plurality of measurement ranges, wherein the measurement ranges have different levels of sensitivity; and
    a controller coupled to the sensor arrangement for receiving the sensor outputs, said controller arranged to select a sensor output corresponding to one of the plurality of sensor measurement ranges as an input signal for a control process, determine if the range of the selected sensor output is of a sensitivity higher than a predetermined sensitivity, convert the value of a higher sensitivity sensor output to a value corresponding to the predetermined sensitivity range, determine an error value between the converted sensor output value and a sensor output corresponding to a range having the predetermined sensitivity, and modify the received sensor output based on the error value when switching from the selected sensor output to a sensor output corresponding to the range of predetermined sensitivity.

2. The system of claim 1 wherein the sensor arrangement comprises a plurality of different sensors each arranged to generate an output at a particular sensitivity.

3. The system of claim 1 wherein the sensor arrangement comprises a sensor having a processing circuit arranged to generate multiple outputs of differing sensitivity.

4. The system of claim 1 wherein the controller is arranged to determine whether the sensitivity of the selected sensor output is higher by comparing a received sensor output to a threshold value, and determining whether the received sensor output is within range based on the outcome of the comparison.

5. The system of claim 1 wherein the range having the predetermined sensitivity is arranged to correspond to a total system response range, and the range having a higher sensitivity is arranged to correspond to a subset within the total response range.

6. The system of claim 5 wherein the controller is further arranged to use the received sensor outputs as a feedback for controlling a position of a throttle plate on a vehicle engine.

7. A method for providing seamless transition between a plurality of sensor measurement ranges comprising:
    selecting a sensor output corresponding to one of the plurality of sensor measurement ranges as an input signal for a control process;
    determining if the range of the selected sensor output is of a sensitivity higher than a predetermined sensitivity;
    converting the value of a higher sensitivity sensor output to a value corresponding to the predetermined sensitivity range;
    determining an error value between the converted sensor output value and a sensor output corresponding to a range having the predetermined sensitivity; and
    modifying the sensor output based on the error value when switching from the selected sensor output to the sensor output corresponding to the range of predetermined sensitivity.

8. The method of claim 7 wherein the selected sensor output is used as a feedback input to the control process.

9. The method of claim 7 wherein selecting the sensor output comprises comparing a received sensor output to a threshold value, and determining whether the received sensor output is within range based on the outcome of the comparison.

10. The method of claim 7 wherein the range having the predetermined sensitivity corresponds to a total system response range, and the range having a higher sensitivity corresponds to a subset within the total response range.

11. The method of claim 7 wherein the selected sensor output is used as a feedback input for controlling position of a throttle plate on a vehicle engine.

* * * * *